(12) United States Patent
Kawanaka et al.

(10) Patent No.: US 9,976,700 B2
(45) Date of Patent: May 22, 2018

(54) AREA MONITORING SENSOR

(71) Applicant: Keyence Corporation, Osaka (JP)

(72) Inventors: Masashi Kawanaka, Osaka (JP); Tsuyoshi Tagashira, Osaka (JP)

(73) Assignee: Keyence Corporation, Osaka (JP)

( * ) Notice: Subject to any disclaimer, the term of this patent is extended or adjusted under 35 U.S.C. 154(b) by 0 days. days.

(21) Appl. No.: 14/943,670

(22) Filed: Nov. 17, 2015

(65) Prior Publication Data

US 2016/0155306 A1    Jun. 2, 2016

(30) Foreign Application Priority Data

Dec. 1, 2014   (JP) .................................. 2014-242906

(51) Int. Cl.
| | | |
|---|---|---|
| G08B 13/18 | (2006.01) | |
| F16P 3/14 | (2006.01) | |
| G01V 8/10 | (2006.01) | |
| G08B 13/183 | (2006.01) | |

(52) U.S. Cl.
CPC ................ F16P 3/142 (2013.01); G01V 8/10 (2013.01); G08B 13/183 (2013.01)

(58) Field of Classification Search
CPC combination set(s) only.
See application file for complete search history.

(56) References Cited

U.S. PATENT DOCUMENTS

| | | | |
|---|---|---|---|
| 6,894,623 B2 | 5/2005 | Hama et al. | |
| 7,485,841 B2 | 2/2009 | Inoue et al. | |
| 7,598,484 B2 | 10/2009 | Yamaguchi | |
| 7,821,394 B2 | 10/2010 | Fukumura | |
| 8,063,780 B2 | 11/2011 | Onishi | |
| 8,069,007 B2 | 11/2011 | Oh | |
| 8,248,235 B2 | 8/2012 | Inoue et al. | |
| 8,319,171 B2 | 11/2012 | Kawabata | |
| 8,330,095 B2 | 12/2012 | Kawabata | |
| 8,415,609 B2 | 4/2013 | Kawabata et al. | |
| 8,487,236 B2 | 7/2013 | Tagashira | |
| 8,648,292 B2 | 2/2014 | Kawabata et al. | |
| 2003/0029992 A1 | 2/2003 | Kudo et al. | |
| 2009/0283666 A1 | 11/2009 | Tagashira | |
| 2009/0295577 A1* | 12/2009 | Yamaguchi | F16P 3/14 340/541 |

(Continued)

FOREIGN PATENT DOCUMENTS

| | | |
|---|---|---|
| JP | 2009-276164 | 11/2009 |
| JP | 2009-276173 | 11/2009 |
| JP | 2009-282640 | 12/2009 |

*Primary Examiner* — Thomas McCormack
(74) *Attorney, Agent, or Firm* — Kilyk & Bowersox, P.L.L.C.

(57) ABSTRACT

There is provided an area monitoring sensor, an operating state of which a user can be checked without approaching a hazard source. An area monitoring sensor, which detects an intruding object in a monitoring area to generate a stop signal for stopping an operation of an external device, is configured of a measurement unit; a display unit that includes a screen display part for displaying an operating state of the measurement unit on a screen; and a wiring cable for detachably connecting the measurement unit and the display unit, to supply electric power between the measurement unit and the display unit.

8 Claims, 9 Drawing Sheets

(56) References Cited

U.S. PATENT DOCUMENTS

| | | | | |
|---|---|---|---|---|
| 2010/0194583 A1* | 8/2010 | Kawabata | ............... | F16P 3/14 |
| | | | | 340/3.6 |
| 2012/0238132 A1* | 9/2012 | McSweyn | ............. | H01R 13/72 |
| | | | | 439/501 |
| 2012/0286951 A1* | 11/2012 | Hess | ................ | G08B 25/008 |
| | | | | 340/539.1 |
| 2016/0163171 A1 | 6/2016 | Yamazaki et al. | | |

* cited by examiner

AREA MONITORING DEVICE 1

AREA MONITORING SENSOR

CROSS-REFERENCE TO RELATED APPLICATIONS

The present application claims foreign priority based on Japanese Patent Application No. 2014-242906, filed Dec. 1, 2014, the contents of which is incorporated herein by reference.

BACKGROUND OF THE INVENTION

1. Field of the Invention

The present invention relates to an area monitoring sensor, and more specifically relates to improvement in an area monitoring sensor that detects an intruding object in a monitoring area to generate a stop signal for stopping an operation of an external device.

2. Description of Related Art

An area monitoring sensor is a safety device which detects an intruding object, such as a person, that has intruded into a monitoring area, to generate a stop signal for stopping an operation of an external device such as a machine tool (e.g., Unexamined Japanese Patent Publication Nos. 2009-276173, 2009-276164, and 2009-282640).

For example, the area monitoring sensor is provided with a light projection part that generates detection light, a scanning part that performs a scan with the detection light in a circumferential direction about a rotational axis, and a light reception part that receives the detection light reflected by a target to generate a detection signal. The intruding object is detected by obtaining a distance to the target based on the detection signal and specifying a two-dimensional position of the target from the distance to the target and a scanning angle of the detection light.

Area setting information to specify the monitoring area and operation setting information to specify an operating condition for the area monitoring sensor are created by use of a terminal device such as a personal computer. For example, by use of orthogonal coordinates with the area monitoring sensor taken as a center, a position of an apex or a distance of an apex from the center is specified, thereby specifying a two-dimensional region of any shape and size as the monitoring area. Further, parameter values for a variety of setting, such as a resolving power and response time for detection of the intruding object, are specified as operating conditions. The terminal device generates setting data made up of the area setting information and the operation setting information based on a user operation, and transmits the setting data to the area monitoring sensor. The intruding object is detected based on this setting data.

The foregoing area monitoring sensor is a safety device aimed at stopping an operation of a hazard source such as a press machine or a work robot when a worker approaches the hazard source. Thus, the area monitoring sensor is often installed in the vicinity of the hazard source. However, in the conventional area monitoring sensor, a light projection part, a scanning part and the like are arranged in a common casing with a display part that displays an operating state. Thus, at the time of occurrence of abnormality such as detection of the intruding object, there is a problem of having to approach the hazard source so as to look at display contents of the display part for checking the operating state of the area monitoring sensor. Further, also at the time of connection of the terminal device to the area monitoring sensor, there is a problem of having to approach the hazard source.

SUMMARY OF THE INVENTION

The present invention was made in view of the above circumstances. It is an object of the present invention to provide an area monitoring sensor, an operating state of which a user can be checked without approaching a hazard source. Further, it is an object of the present invention to provide an area monitoring sensor which can be connected with a setting data creating device without approaching a hazard source.

According to one embodiment, an area monitoring sensor of the invention is an area monitoring sensor which detects an intruding object in a monitoring area to generate a stop signal for stopping an operation of an external device. The area monitoring sensor is provided with a measurement unit, a display unit and a power cable. The measurement unit includes a light projecting section for generating detection light, a scanning section for performing a scan with the detection light in a circumferential direction about a rotational axis, a light receiving section for receiving the detection light reflected by a target to generate a detection signal, and a distance calculating section for obtaining a distance to the target based on the detection signal. The display unit includes a screen displaying section for displaying an operating state of the measurement unit on a screen. The power cable is configured to detachably connect the measurement unit and the display unit, to supply electric power between the measurement unit and the display unit.

With such a configuration, the display unit is separated from the measurement unit, and hence the display unit can check the operating state of the measurement unit even when located separately from the measurement unit. Accordingly, even when the measurement unit is installed in the vicinity of a hazard source, the user can check the operating state without approaching the hazard source. Further, since electric power is supplied between the measurement unit and the display unit through the power cable, it is possible to simplify a configuration of the area monitoring sensor as compared to the case of providing a power circuit in both the measurement unit and the display unit. Moreover, since the power cable is detachable, it is possible to facilitate replacement of the measurement unit.

In addition to the above configurations, in an area monitoring sensor according to another embodiment of the invention, the display unit further includes an external communication port for communication with a setting data creating device that generates setting data made up of area setting information to specify the monitoring area and operation setting information to specify an operating condition for the measurement unit.

With such a configuration, the external communication port for the setting data creating device is provided in the display unit, and thus, even when the measurement unit is installed in the vicinity of the hazard source, the user can connect the setting data creating device to the area monitoring sensor without approaching the hazard source.

In addition to the above configurations, in an area monitoring sensor according to still another embodiment of the invention, the measurement unit further includes an intrusion detecting section for detecting an intruding object in a monitoring area based on a distance to the target, a scanning angle of the detection light and the setting data, to generate the stop signal.

With such a configuration, there is no need to transmit and receive information indicating the distance measurement result and the scanning angle as compared to the case of providing the intrusion detecting section in the display unit, whereby it is possible to reduce degradation of response performance for detection of the intruding object. Further, it is possible to reduce an increase in communication load between the measurement unit and the display unit In addition to the above configurations, in an area monitoring sensor according to still another embodiment of the invention, the measurement unit further includes two input-output ports for communication with the display unit or the measurement unit, and each of the input-output ports is connected to the display unit or the measurement unit by use of a communication cable, to connect two or more of the measurement units to the display unit through a common bus. With such a configuration, it is possible to simplify a configuration of an input-output port in the display unit as compared to that in a star-type topology.

In addition to the above configurations, in an area monitoring sensor according to still another embodiment of the invention, the display unit includes a non-volatile setting data storing section for holding the setting data received from the setting data creating device, and a setting data transmitting section for reading the setting data from the setting data storing section every time a main power is turned on, to transmit the read data to the measurement unit.

With such a configuration, the setting data allocated to each measurement unit can be unitarily managed in the display unit. Thus, for example, even when the measurement unit is replaced while the main power is in an off-state, the measurement unit can be operated based on the setting data held by the display unit.

In addition to the above configurations, in an area monitoring sensor according to still another embodiment of the invention, the measurement unit includes a light emission timing adjusting section for generating a timing control signal for adjusting light emission timing for each of the light projecting sections among a plurality of measurement units, and a control signal transmitting section for transmitting the timing control signal to the measurement unit that is connected through the input-output port. With such a configuration, mutual interference between the measurement units is reduced, thus allowing improvement in detection accuracy of the intruding object.

In addition to the above configurations, in an area monitoring sensor according to still another embodiment of the invention, the measurement unit further includes a power circuit that is connected with an external power supply to supply electric power to the display unit by use of electric power supplied from the external power supply. With such a configuration, the power circuit needs not be provided in the display unit, and hence a configuration of the display unit can be simplified.

According to the present invention, it is possible to provide the area monitoring sensor, the operating state of which a user can be checked without approaching the hazard source. Further, according to the present invention, it is possible to provide the area monitoring sensor which can be connected with the setting data creating device without approaching the hazard source.

DETAILED DESCRIPTION OF PREFERRED EMBODIMENTS

First, a schematic configuration of an area monitoring sensor presumed in the present invention will be described below with reference to FIG. 1 to FIGS. 3A and 3B.

First Embodiment

<Area Monitoring Device 1>

Figure 1:
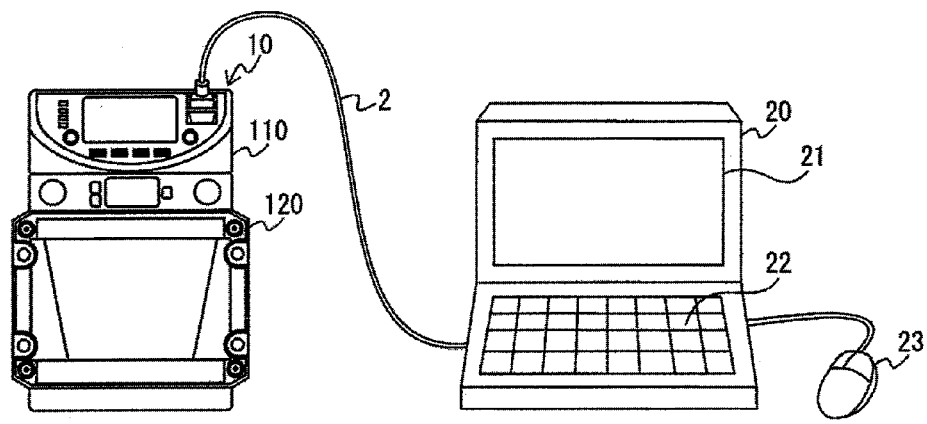
FIG. 1 is a perspective view showing one configuration example of an area monitoring device including an area monitoring sensor according to a first embodiment of the present invention.

FIG. 1 is a perspective view showing one configuration example of an area monitoring device 1 including an area monitoring sensor 10 according to a first embodiment of the present invention. The figure shows the area monitoring sensor 10 capable of separating a display unit 110 from a measurement unit 120.

The area monitoring device 1 is configured of the area monitoring sensor 10 that detects an intruding object in a monitoring area to generate a stop signal for stopping an operation of an external device, and a setting data creating device 20 that creates setting data for the area monitoring sensor. The area monitoring sensor 10 and the setting data creating device 20 are connected through a communication cable 2.

The setting data creating device 20 is a terminal device such as a personal computer, which is provided with a screen display part 21, a key board 22 and a mouse 23, and installed with an application program for the area monitoring sensor. The setting data is made up of area setting information to specify the monitoring area and operation setting information to specify an operating condition for the area monitoring sensor 10.

For example, two-dimensional positions of two or more apexes are each specified, thereby specifying the monitoring area as a region surrounded by a figure formed by connecting these apexes. Further, the operating conditions include a resolving power and response time for detection of intrusion, an output form of an OSSD (described later), the validity or non-validity of an EDM (External Device Monitoring) function, and the like. The setting data creating device 20 generates the setting data based on a user operation, and transmits the data to the area monitoring sensor 10.

The area monitoring sensor 10 monitors the monitoring area based on the setting data received from the setting data creating device 20. The area monitoring sensor 10 is an optical scanning-type safety sensor, and is configured of the display unit 110 and the measurement unit 120. The measurement unit 120 is a head unit installed in the vicinity of a hazard source, and performs a scan with detection light, and receives the detection light reflected by a target, to obtain a distance to the target. The display unit 110 is an interface unit that accepts a user operation and displays an operating state of the measurement unit 120 on a screen.

<Production System>

Figure 2:
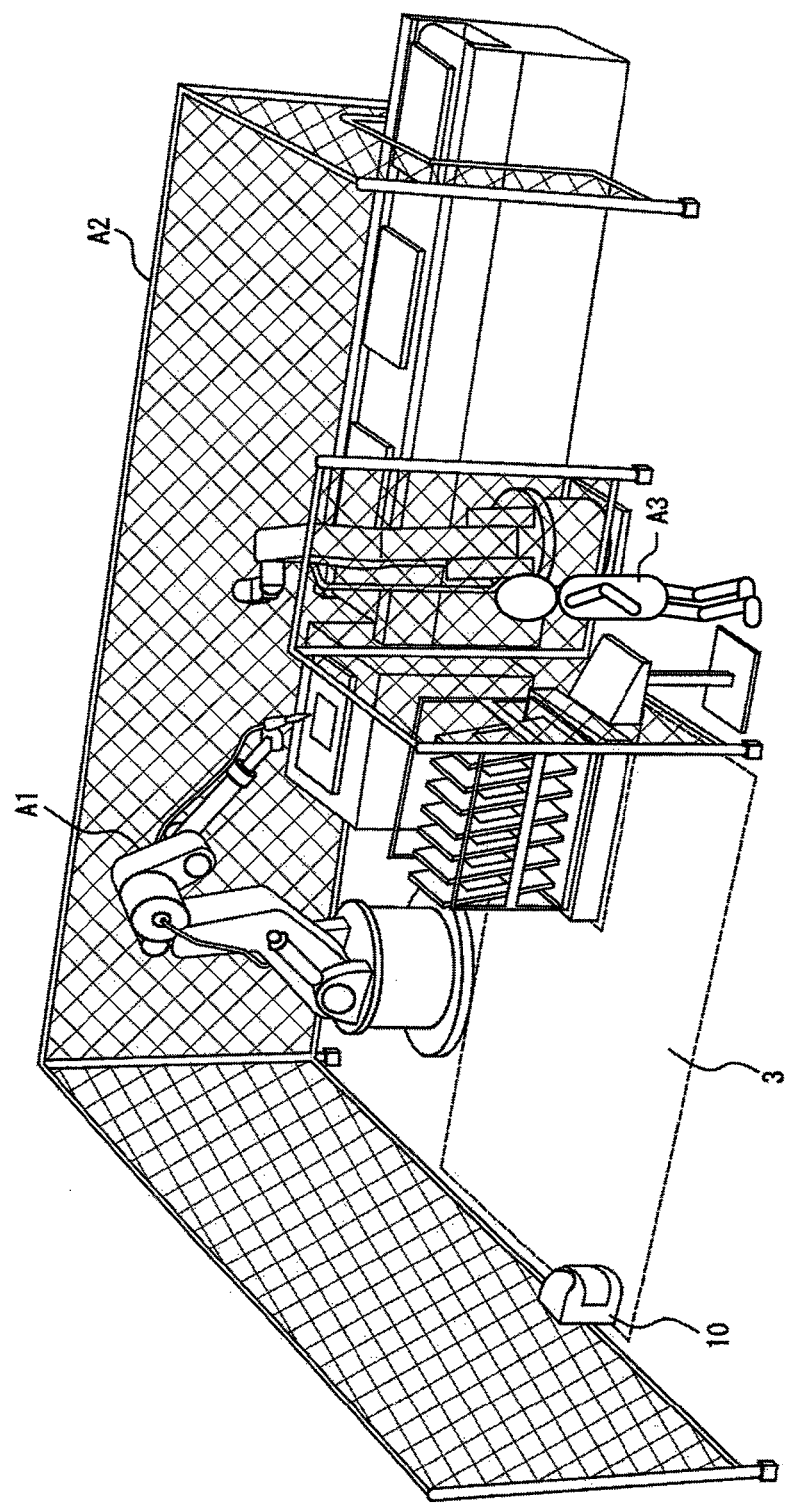
FIG. 2 is a perspective view showing a configuration example of a production system installed with an area monitoring sensor of FIG. 1.

FIG. 2 is a perspective view showing a configuration example of a production system installed with the area monitoring sensor 10 of FIG. 1. In this production system, a carrier and a work robot A1 are arranged in a region partitioned by a protective fence A2. An area around mechanical equipment, such as an operating area of the work robot A1, is set as a monitoring area 3, and an intruding object in the monitoring area 3 is detected by the area monitoring sensor 10.

The area monitoring sensor 10 monitors the monitoring area 3 by scanning it with detection light and detects an intruding object, such as an operator A3 who operates a control board of the mechanical equipment, to generate a stop signal for stopping an operation of the external device. The monitoring area 3 is formed of a region within an installation surface on which the area monitoring sensor 10 is installed, such as a region within a horizontal floor surface. The intruding object is detected by receiving detection light reflected by the target to obtain a distance to the target, and specifying a two-dimensional position of the target from the distance to the target and a scanning angle of the detection light.

The stop signal is used as a control signal for stopping the work robot A1 that works around the monitoring area 3. For example, the area monitoring sensor 10 has an OSSD (Output Signal Switching Device). With the intruding object being not present in the monitoring area 3, the OSSD enters an on-state and an operation permission signal is outputted. On the other hand, with the intruding object being present in the monitoring area 3, the OSSD enters an off-state, and an operation non-permission signal is outputted as the stop signal.

<Area Monitoring Sensor 10>

Figure 3A:
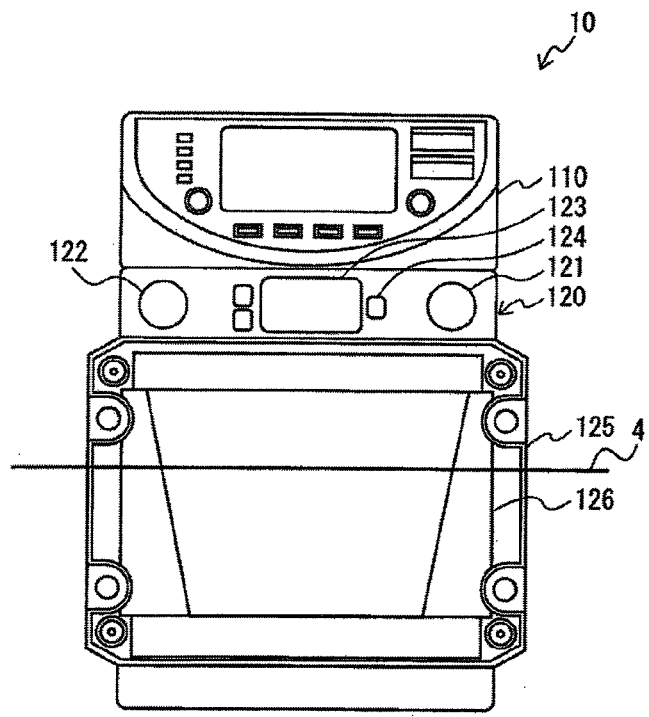
FIGS. 3A and 3B are views showing a configuration example of the area monitoring sensor of FIG. 1.
Figure 3B:
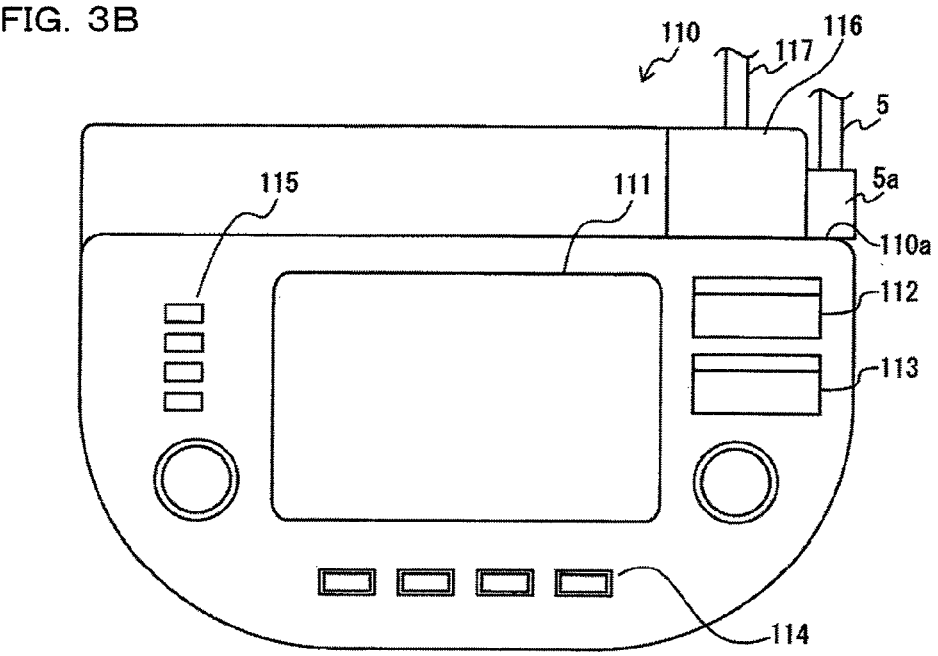

FIGS. 3A and 3B are views showing a configuration example of the area monitoring sensor 10 of FIG. 1, and show a separation-type safety sensor. FIG. 3A shows a case where the area monitoring sensor 10 is viewed from above, and FIG. 3B shows the display unit 110.

This area monitoring sensor 10 displays a variety of information, and is configured of the display unit 110 that accepts a user operation, and the measurement unit 120 that generates detection light and performs a scan with the detection light along a horizontal scanning surface 4. The display unit 110 is arranged on the top surface of the measurement unit 120.

As the detection light, for example, laser light with a wavelength in the infrared region is used. The detection light is repeatedly scanned in a certain period. The measurement unit 120 is arranged with cameras 121 and 122 for photographing the monitoring area 3, and with indicators 123 and 124 for indicating the operating state. Further, a scanner part 125 of the measurement unit 120 is fitted with a protection cover 126 for protecting a scanning mirror. The detection light is scanned in a circumferential direction about a rotational axis of the mirror. The scanning surface 4 is orthogonal to the rotational axis.

The cameras 121 and 122 and the indicators 123 and 124 are arranged above the scanner part 125. That is, the cameras 121 and 122 are arranged above the scanning surface 4 in terms of the rotational axial direction. With such a configuration, a parallax in the rotational axial direction occurs between the scanning surface 4 and photographing directions of the cameras 121 and 122, thus allowing obtainment of a camera image of the scanning surface 4 viewed from above.

The cameras 121 and 122 are imaging devices both arranged toward a horizontal direction, and oriented in mutually different directions. The cameras 121 and 122 are arranged respectively on the right side and the left side of the measurement unit 120 with the indicators 123 and 124 placed therebetween within the horizontal surface. The indicator 123 is an indicating lamp that indicates the operating state by means of a color or a lighting state. For example, the indicator 123 is lighted in different colors respectively for the on-state and the off-state of the OSSD. The indicator 124 is an indicating lamp that indicates each of a variety of error states by means of a color or a lighting state.

The display unit 110 is arranged with a screen display part 111, cable connecting ports 112, 113, a user operation part 114, and an indicator part 115. The screen display part 111 is a display device that displays on a screen a result of detection of the intruding object, a monitoring status, and the like. For example, an LCD (Liquid Crystal Display) is used for the screen display part 111, the LCD being capable of displaying in color an image photographed by the camera 121 or 122.

The cable connecting port 112 is detachably connected with a communication cable 2 extending from the setting data creating device 20. The cable connecting port 113 is detachably connected with a communication cable extending from a safety controller (not shown). The safety controller is a control device that stops an operation of a machine tool such as a press machine or a work robot when the stop signal is received from the area monitoring sensor 10. For example, the safety controller is a PLC (Programmable Logic Controller).

The user operation part 114 is made up of two or more user operation buttons used for switching the screen, selecting a menu item, and the like. The indicator part 115 is made up of two or more indicating lamps that indicate the operating state by means of a color or a lighting state, and indicates the output state of the OSSD and the like. The display unit 110 communicates with the measurement unit 120, and even when located separately from the measurement unit 120, the display unit 110 can check the result of detection of the intruding object and the monitoring status.

This display unit 110 is detachably fitted with a memory part 116 connected to an external power supply (not shown) through a power cable 117. The memory part 116 is a module including a memory for storing the setting data acquired from the setting data creating device 20 and a power fuse for cutting off an overcurrent. The memory part 116 is detachably mounted in a body casing 110a of the display unit 110. The power cable 117 is connected to the memory part 116. The display unit 110 is supplied with electric power from the external power supply through the power cable 117 and the memory part 116.

Further, this display unit 110 is detachably fitted with a connector part 5a of a wiring cable 5 extending from the measurement unit 120. The display unit 110 and the measurement unit 120 are connected through the wiring cable 5.

Next, a configuration of a characteristic portion of the area monitoring sensor 10 according to the present invention will be described below, with reference to FIGS. 4 to 6.

Figure 4B:
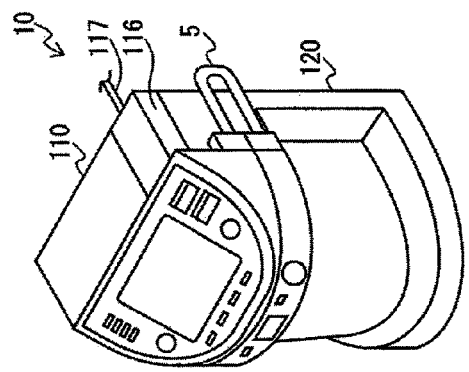
FIGS. 4A and 4B are perspective views each showing one example of a usage form of the area monitoring sensor of FIGS. 3A and 3B.
Figure 4A:
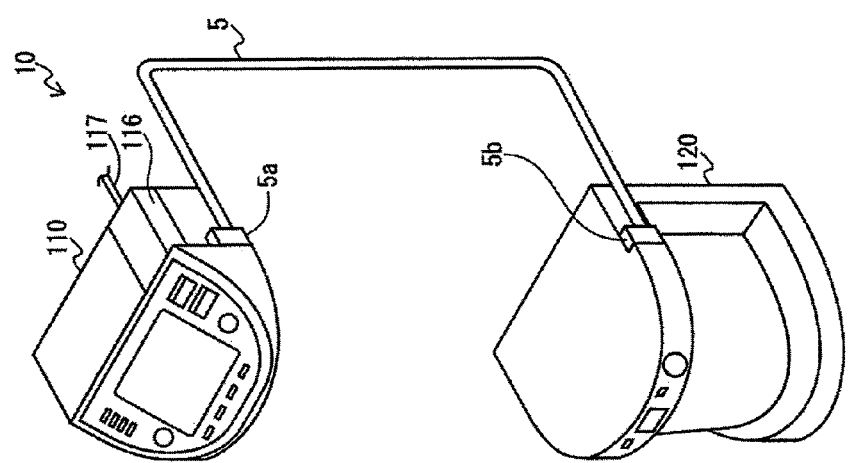

FIGS. 4A and 4B are perspective views each showing one example of a usage form of the area monitoring sensor 10 of FIGS. 3A and 3B. FIG. 4A shows the case of using the display unit 110 and the measurement unit 120 in a separate state, and FIG. 4B shows the case of using the two units in a unified state.

When the two units, the display unit 110 and the measurement unit 120, are used in a mutually separate manner, they are connected using the wiring cable 5 with a predetermined length.

The wiring cable 5 is a transmission cable including a power wire for supplying electric power between the display unit 110 and the measurement unit 120 and a signal wire for making communication therebetween. The wiring cable 5 detachably connects the display unit 110 and the measurement unit 120. Both ends of the wiring cable 5 are respectively connected with the connector part 5a and a connector part 5b. The connector part 5a is a connection part for making connection to the display unit 110. The connector part 5b is a connection part for making connection to the measurement unit 120. In this example, the connection part as the connector part 5a is provided on the left-side surface of the display unit 110, and the connection part as the connector part 5b is provided on the left-side surface of the measurement unit 120.

The setting data received from the setting data creating device 20 is transmitted from the display unit 110 to the measurement unit 120 through the wiring cable 5. Further, the image data photographed by the camera 121 or 122 and information indicating the operating state of the measurement unit 120, such as the state of the OSSD, a distance measurement result and a scanning angle of the detection light are transmitted from the measurement unit 120 to the display unit 110 through the wiring cable 5. Further, the stop signal indicating the off-state of the OSSD is transmitted from the measurement unit 120 to the display unit 110 through the wiring cable 5.

With such a configuration, even when the display unit 110 is located separately from the measurement unit 120, it is possible to check the operating state of the measurement unit 120 in the display unit 110. Accordingly, even when the measurement unit 120 is installed in the vicinity of the hazard source, the user can check the operating state without approaching the hazard source. Further, since the wiring cable 5 is detachable, it is possible to facilitate replacement of the measurement unit 120.

When the two units, the display unit 110 and the measurement unit 120, are used in a unified manner, they are connected using a coupling member, not shown. In this case, the display unit 110 and the measurement unit 120 are connected using the wiring cable 5 with a shorter length than in the case of FIG. 4A.

<Measurement Unit 120>

Figure 5:
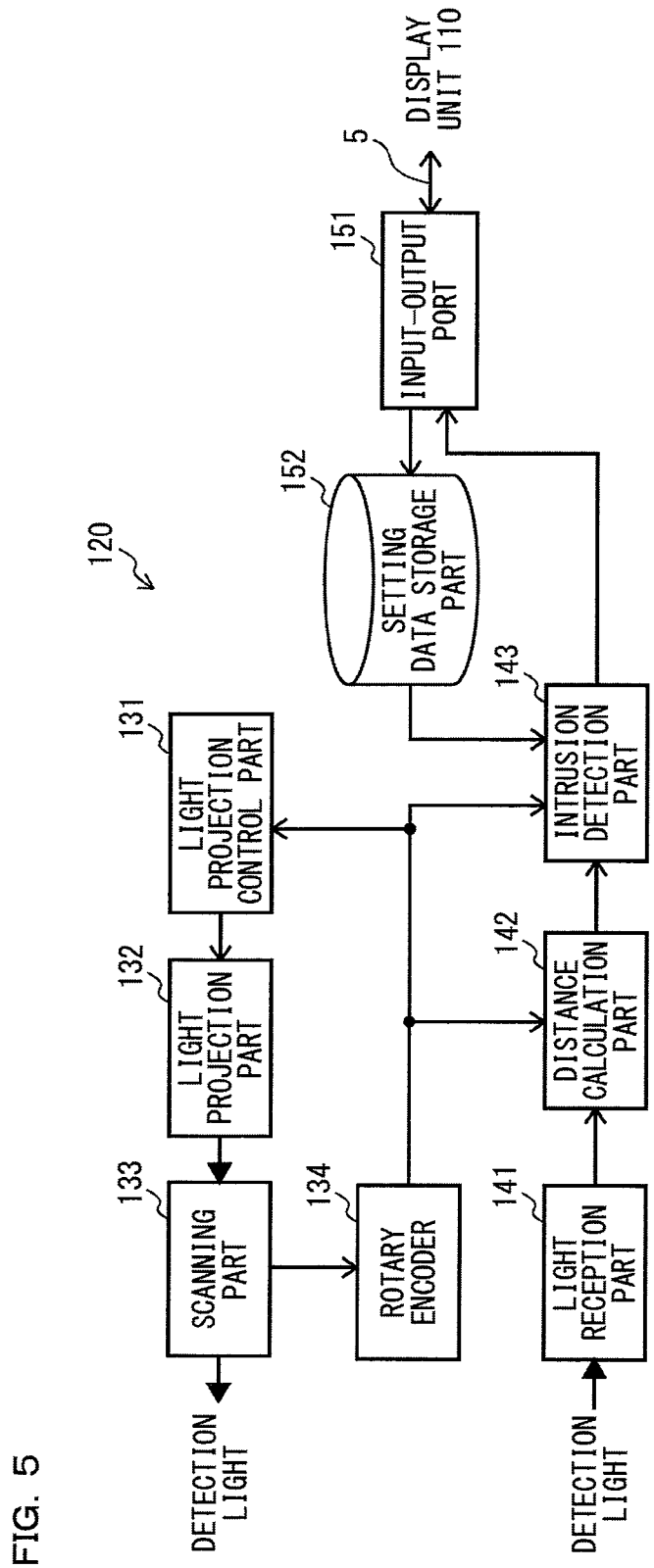
FIG. 5 is a block diagram showing one example of a functional configuration in a measurement unit of FIGS. 3A and 3B.

FIG. 5 is a block diagram showing one example of a functional configuration in the measurement unit 120 of FIGS. 3A and 3B. This measurement unit 120 is configured of a light projection control part 131, a light projection part 132, a scanning part 133, a rotary encoder 134, a light reception part 141, a distance calculation part 142, an intrusion detection part 143, an input-output port 151, and a setting data storage part 152.

The setting data storage part 152 holds setting data received from the setting data creating device 20. The light projection part 132 is a light source device that generates detection light and emits the light toward the scanning part 133. The scanning part 133 is a scanner that performs a scan with the detection light in the circumferential direction about the rotational axis, along the scanning surface 4 intersecting with the rotational axis. The scanning part 133 is configured of a mirror (not shown) and a driving part that rotates the mirror, the mirror reflecting the detection light, incident from the light projection part 132, toward the target.

The light reception part 141 receives the detection light reflected by the target, to generate a detection signal. The rotary encoder 134 is a rotation detecting device that detects a rotational angle of the mirror of the scanning part 133, to generate a rotational pulse signal. The light projection control part 131 controls the light projection part 132 based on the rotational pulse signal of the rotary encoder 134, to adjust the light projection timing for the detection light.

For example, the detection light is emitted every time the mirror rotates by 360°/1000.

The distance calculation part 142 obtains a distance to the target based on the detection signal from the light reception part 141, and outputs the measurement result to the intrusion detection part 143. For example, the distance from the area monitoring sensor 10 to the target is obtained by measuring TOF (Time Of Flight) of the detection light. Specifically, the distance to the target is calculated by comparing the detection signal with the rotational pulse signal of the rotary encoder 134 and specifying delay time from projection of the detection light to reception thereof. The delay time from the light projection to the light reception is measured every time the detection light is emitted.

The intrusion detection part 143 detects an intruding object in the monitoring area 3 based on the setting data in the setting data storage part 152, the distance to the target and the scanning angle of the detection light, to generate the stop signal for stopping the operation of the external device. The scanning angle of the detection light is specified based on the rotational pulse signal of the rotary encoder 134. Further, it is determined whether or not the target is present in the monitoring area 3 by specifying a two-dimensional position of the target from the distance to the target and the scanning angle of the detection light. The information indicating the operating state of the measurement unit 120 and the stop signal indicating the off-state of the OSSD are outputted to the display unit 110 through the input-output port 151.

The input-output port 151 is an interface part for communication with the display unit 110, and is connected with the wiring cable 5. This input-output port 151 performs processing of receiving the setting data from the display unit 110, and transmitting to the display unit 110 the information indicating the operating state of the measurement unit 120 and the stop signal indicating the off-state of the OSSD.

The setting data storage part 152 is a storage device that holds the setting data received from the display unit 110. For example, the setting data storage part 152 is made up of a volatile memory, and the setting data in the setting data storage part 152 is lost when a main power is brought into the off-state.

<Display Unit 110>

Figure 6:
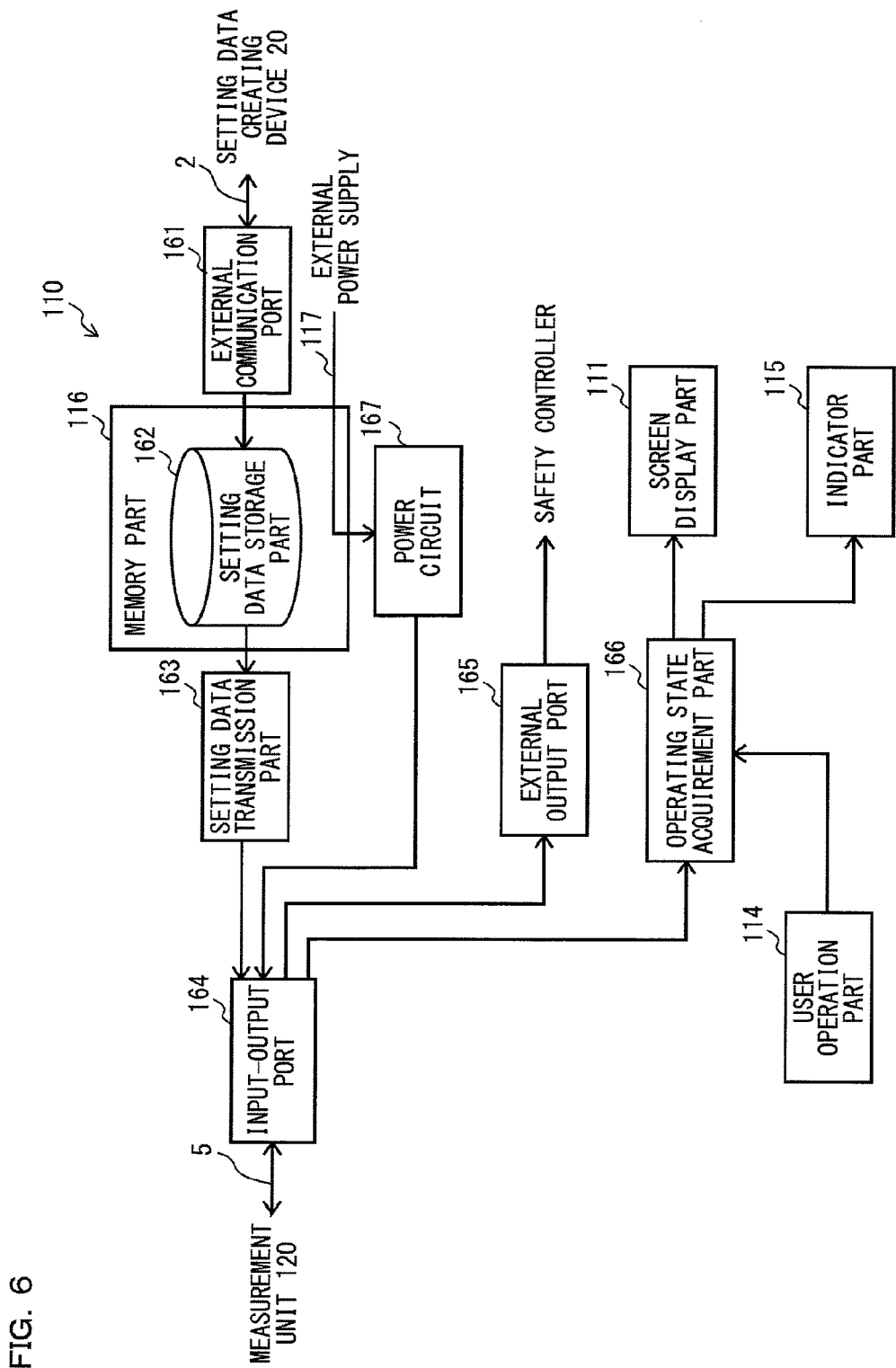
FIG. 6 is a block diagram showing one example of a functional configuration in a display unit of FIGS. 3A and 3B.

FIG. 6 is a block diagram showing one example of a functional configuration in the display unit 110 of FIGS. 3A and 3B. This display unit 110 is configured of the screen display part 111, the user operation part 114, the indicator part 115, the memory part 116, an external communication port 161, a setting data transmission part 163, an input-output port 164, the external output port 165, an operating state acquirement part 166, and a power circuit 167. The memory part 116 has a setting data storage part 162.

The external communication port 161 is an interface part for communication with the setting data creating device 20, and is connected with the communication cable 2. The external communication port 161 for the setting data creating device is provided in the display unit 110, and thus, even when the measurement unit 120 is installed in the vicinity of the hazard source, the user can connect the setting data creating device 20 to the area monitoring sensor 10 without approaching the hazard source.

The setting data storage part 162 is a non-volatile storage device that holds the setting data received from the setting data creating device 20. For example, the setting data storage part 162 is made up of a semiconductor memory such as a flash memory. The setting data in the setting data storage part 162 is held even when the main power is in the off-state.

The setting data transmission part 163 reads the setting data from the setting data storage part 162 every time the main power is turned on, and transmits the read data to the measurement unit 120 through the input-output port 164. For example, the main power is switched to the on-state by pressing the user operation button of the user operation part 114. Based on such a power turning-on operation, the setting data is transmitted to the measurement unit 120.

With such a configuration, the setting data allocated to the measurement unit 120 can be managed in the display unit 110. Thus, for example, even when the measurement unit 120 is replaced while the main power is in the off-state, the measurement unit 120 can be operated based on the setting data held by the display unit 110.

The input-output port 164 is an interface part for communication with the measurement unit 120, and is connected with the wiring cable 5. The external output port 165 is an interface part for outputting the stop signal, received from the measurement unit 120 through the input-output port 164, to the safety controller. The operating state acquirement part 166 acquires information indicating the operating state from the measurement unit 120 through the input-output port 164, to display the operating state in the screen display part 111 and the indicator part 115. For example, the operating state is displayed in the screen display part 111 based on a user operation. The screen display part 111 displays a character message showing whether the OSSD is in the on-state or the off-state and an explanation of the error state and its contents.

The power circuit 167 is a power supply device which is connected to the external power supply through the memory part 116, and supplies electric power to the devices in the display unit 110 and the measurement unit 120 by use of the electric power supplied from the external power supply. The measurement unit 120 is supplied with electric power through the input-output port 164.

For example, the external power supply is a DC power supply that supplies a DC voltage of 24 V. The power circuit 167 converts this DC voltage to a voltage usable in an internal circuit, e.g., a DC voltage of 5 V or 3.3 V. Further, when an APD (Avalanche Photo-Diode) is to be used as a photo detection element of the light reception part 141, the power circuit 167 converts the DC voltage supplied from the external power supply to a DC voltage of 190 V.

According to the present embodiment, the display unit 110 is separated from the measurement unit 120, and hence the display unit 110 can check the operating state of the measurement unit 120 even when located separately from the measurement unit 120. Further, since electric power is supplied between the measurement unit 120 and the display unit 110 through the wiring cable 5, it is possible to simplify the configuration of the area monitoring sensor 10 as compared to the case of providing a power circuit in both the measurement unit 120 and the display unit 110.

Further, providing the intrusion detection part 143 in the measurement unit 120 eliminates the need to transmit and receive information indicating the distance measurement result and the scanning angle as compared to the case of providing the intrusion detecting section in the display unit 110, and hence it is possible to reduce degradation of response performance for detection of the intruding object. Further, it is possible to reduce an increase in communication load between the measurement unit 120 and the display unit 110.

Further, in the present embodiment, the example of the case has been described where the external output port 165 and the power circuit 167 are provided in the display unit 110, but the present invention does not limit the arrangement forms of the power circuit and the external output port to the described arrangement forms. For example, a configuration may be formed such that an external output port and a power circuit may be arranged in the measurement unit 120.

Figure 7:
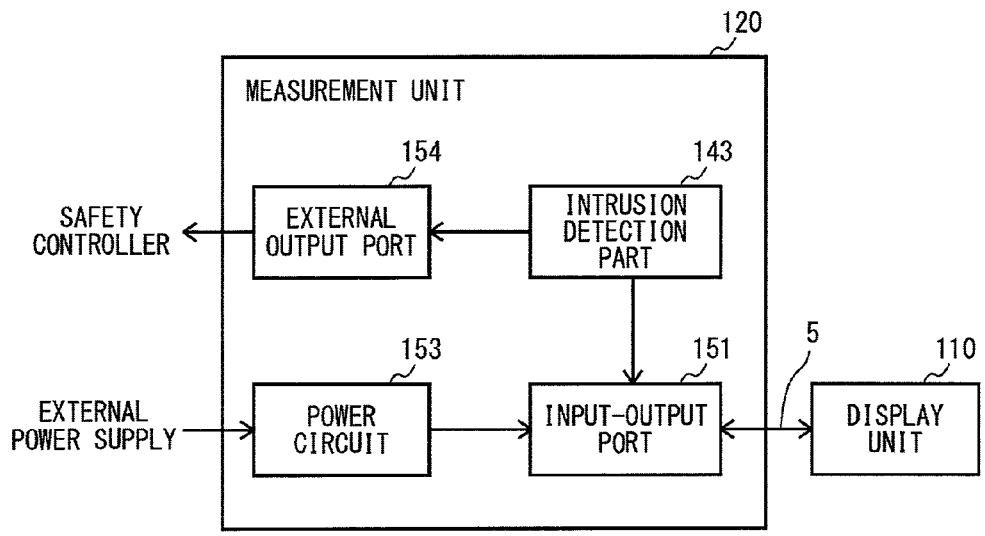
FIG. 7 is a block diagram showing another configuration example of the area monitoring sensor.

FIG. 7 is a block diagram showing another configuration example of the area monitoring sensor 10. The figure shows the case of providing a power circuit 153 and an external output port 154 in the measurement unit 120. In comparison with the measurement unit 120 of FIG. 5, this measurement unit 120 is different in including the power circuit 153 and the external output port 154, and a part of the functional block is omitted.

The power circuit 153 is a power supply device which is connected to the external power supply, and supplies electric power to the devices in the display unit 110 and the measurement unit 120 by use of the electric power supplied from the external power supply. The display unit 110 is supplied with electric power through the input-output port 151.

The external output port 154 is an interface part for outputting the stop signal from the intrusion detection part 143 to the safety controller. The stop signal is outputted from the external output port 154 to the safety controller without passing through the display unit 110. Providing the power circuit 153 in the measurement unit 120 to supply electric power to the display unit 110 eliminates the need to provide a power circuit in the display unit 110, and hence the configuration of the display unit 110 can be simplified.

Further, in the present embodiment, the example of the case has been described where the intrusion detection part 143 is provided in the measurement unit 120, but the present invention does not limit the arrangement form of the intrusion detecting section to the described arrangement form. For example, a configuration may be formed such that an intrusion detecting section is provided in the display unit 110, the section detecting the intruding object in the monitoring area 3 based on the distance to the target, the scanning angle of the detection light and the setting data, to generate the stop signal for stopping the operation of the external device.

Second Embodiment

In the first embodiment, the description has been given of the example of the case where the display unit 110 and the measurement unit 120 are connected through the wiring cable 5. In contrast, in the present embodiment, a description will be given of a case where two or more measurement units 120 are connected to one display unit 110 through common buses.

Figure 8:
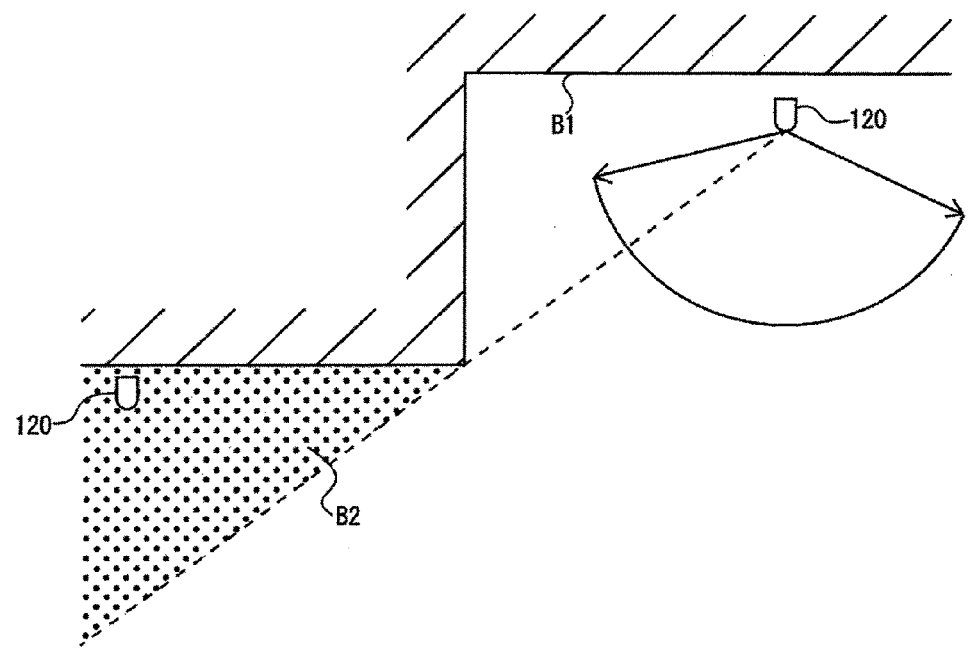
FIG. 8 is an explanatory view schematically showing one example of a usage form of the area monitoring sensor according to a second embodiment of the present invention.

FIG. 8 is an explanatory view schematically showing one example of a usage form of the area monitoring sensor 10 according to a second embodiment of the present invention.

This figure shows two measurement units 120 each arranged in the vicinity of a wall B1 having steps. A first measurement unit 120 is arranged with its rear surface facing the wall surface, and a scan is performed with detection light in the circumferential direction about the measurement unit 120, to monitor a predetermined region.

However, with the wall B1 having the steps, a region B2, where the distance measurement cannot be performed by the first measurement unit 120, exists as a blind spot. For monitoring this region B2, a second measurement unit 120 is arranged such that the region B2 is included in a region where the distance measurement is possible.

In this area monitoring sensor 10, by use of a plurality of measurement units 120, it is possible to monitor as the monitoring area 3 a region where the distance measurement cannot be performed just by one measurement unit 120, and detect the intruding object.

<Area Monitoring Sensor 10>

Figure 9:
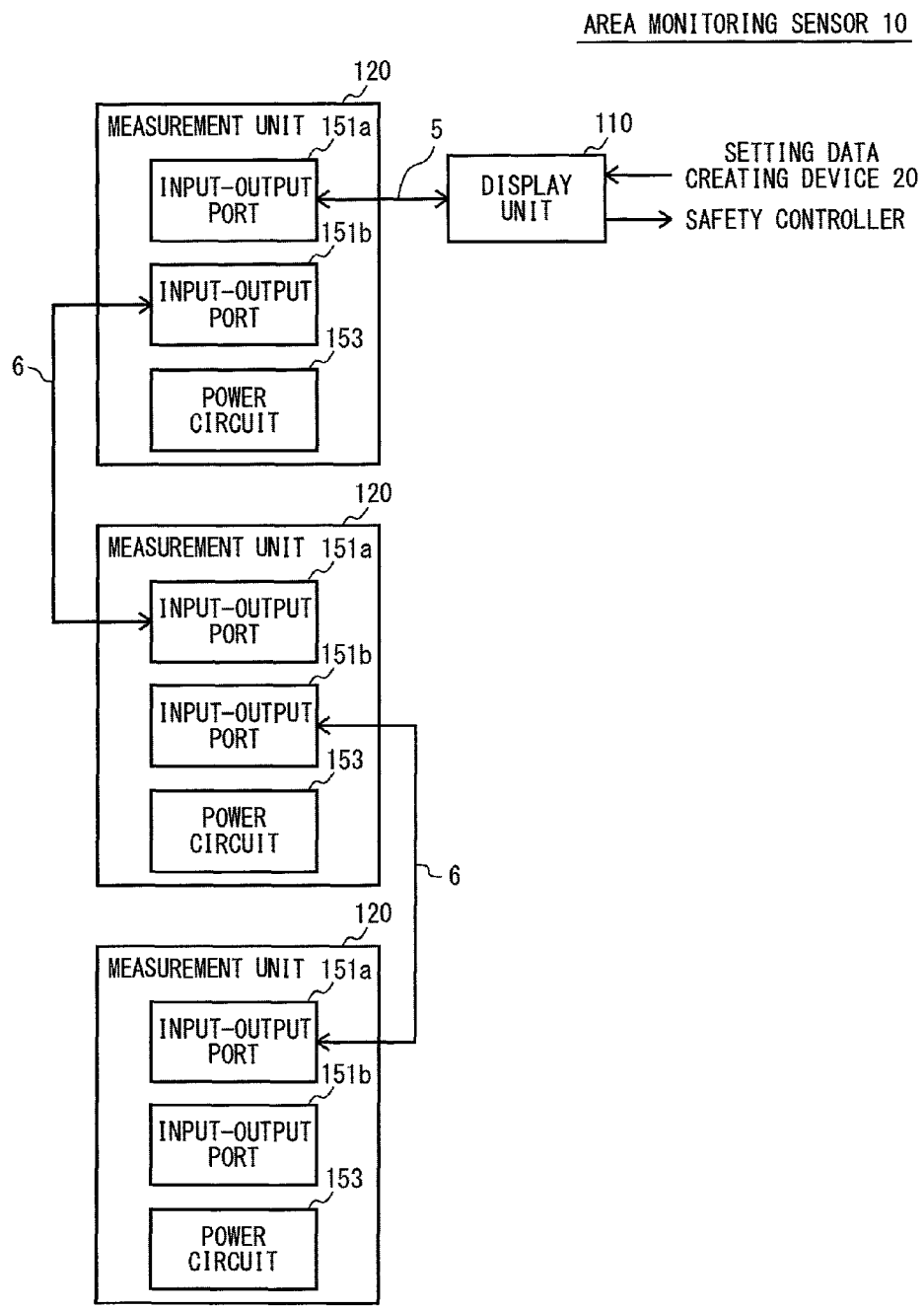
FIG. 9 is a block diagram showing a configuration example of the area monitoring sensor of FIG. 8.

FIG. 9 is a block diagram showing a configuration example of the area monitoring sensor 10 of FIG. 8. This area monitoring sensor 10 is provided with one display unit 110 and three measurement units 120. First to third measurement units 120 are connected to the display unit 110 in a daisy chain mode, to form a bus-type network. With such a configuration, it is possible to simplify the configuration of the input-output port in the display unit 110 as compared to that in a star-type topology.

Each measurement unit 120 is provided with two input-output ports 151a and 151b for communication with the display unit 110 or the other measurement unit 120, and the power circuit 153 that supplies electric power to the devices in the measurement unit 120 by use of the electric power supplied from the external power supply.

In the first measurement unit 120, the input-output port 151a is connected to the display unit 110 by use of the wiring cable 5, and the input-output port 151b is connected to the second measurement unit 120 by use of a communication cable 6. The communication cable 6 is a transmission cable including a signal wire for making communication between the two measurement units 120, and detachably connects the two units.

In the second measurement unit 120, the input-output port 151a is connected to the first measurement unit 120 by use of the communication cable 6, and the input-output port 151b is connected to the third measurement unit 120 by use of the communication cable 6. In the third measurement unit 120, the input-output port 151a is connected to the second measurement unit 120 by use of the communication cable 6.

The setting data creating device 20 creates different setting data for each measurement unit 120.

The setting data received by the display unit 110 from the setting data creating device 20 is transmitted to the corresponding measurement unit 120. Further, the display unit 110 reads the setting data from the setting data storage part 162 every time the main power is turned on, to transmit the read data to each measurement unit 120. With such a configuration, the setting data allocated to each measurement unit 120 can be unitarily managed in the display unit 110.

The information indicating the operating state of the measurement unit 120, such as the state of the OSSD, the distance measurement result and the scanning angle of the detection light is transmitted to the display unit 110, and displayed in the screen display part 111. Further, the stop signal indicating the off-state of the OSSD is transmitted to the display unit 110, and outputted from the display unit 110 to the safety controller.

<Measurement Unit 120>

Figure 10:
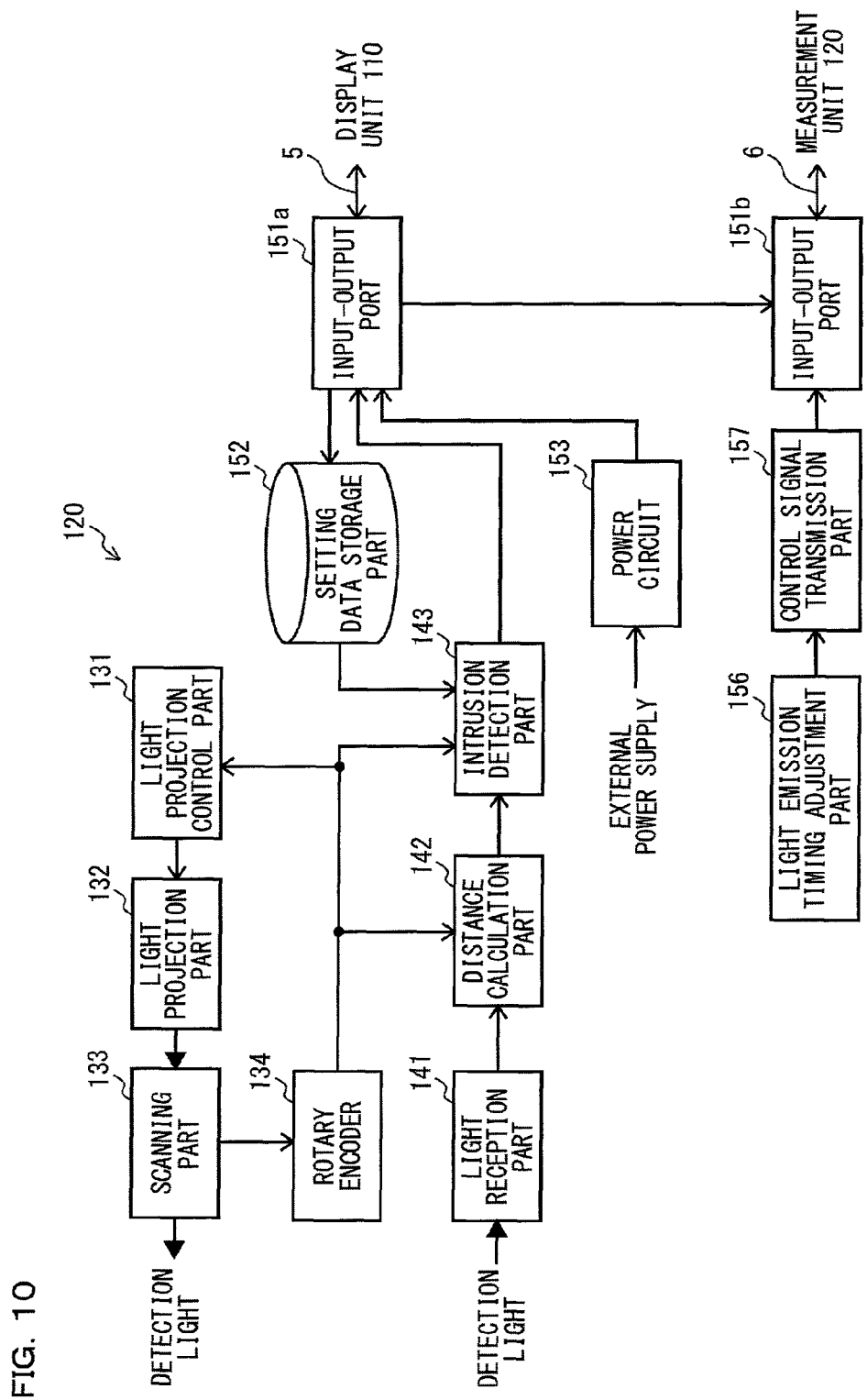
FIG. 10 is a block diagram showing a configuration example of the measurement unit of FIG. 9.

FIG. 10 is a block diagram showing a configuration example of the measurement unit 120 of FIG. 9. The figure shows the first measurement unit 120 that operates as a bus master. In comparison with the measurement unit 120 of FIG. 5, this measurement unit 120 is different in including the input-output ports 151a, 151b, the power circuit 153, a light emission timing adjustment part 156, and a control signal transmission part 157.

The light emission timing adjustment part 156 generates a timing control signal for adjusting light emission timing for each of the light projection parts 132 among the plurality of measurement units 120, and outputs the signal to the control signal transmission part 157. For example, the timing control signal is generated based on setting data indicating the topology of the measurement units 120.

The control signal transmission part 157 transmits the timing control signal to the other measurement unit 120 that is connected through the input-output port 151b. When the light emission timing for the light projection parts 132 in the plurality of measurement units 120 overlap, one measurement unit 120 may receive detection light projected by the other measurement unit 120, resulting in erroneous detection of the intruding object. A phenomenon that erroneous detection occurs due to overlapping of the light emission timing among the measurement units 120 is called mutual interference.

According to the present embodiment, synchronizing the timing for projecting detection light among the plurality of measurement units 120 connected by the network can reduce the mutual interference among the measurement units 120, thus enabling improvement in detection accuracy of the intruding object.

It should be noted that in the second embodiment, the example of the case has been described where the first measurement unit 120 operates as the bus master, but the present invention does not limit the unit that operates as the bus master or a base unit to the described unit. For example, a configuration may be made such that any of the display unit 110 and the second and third measurement units 120 operates as the bus master or the base unit.

What is claimed is:

1. An area monitoring sensor which detects an intruding object in a monitoring area to generate a stop signal for stopping an operation of an external device, the area monitoring sensor comprising:
   a measurement unit that includes
      a first casing,
      a cover disposed on the first casing,
      a light source, enclosed by the first casing and the cover, which generates a detection light,
      a scanning rotator, enclosed by the first casing and the cover, which directs the detection light to the monitoring area through the cover to scan the monitoring area in a circumferential direction about a rotational axis,
      a light receiver, enclosed by the first casing and the cover, which receives the detection light reflected by a target through the cover to generate a detection signal,
      an angle sensor which detects a scanning angle of the detection light,
      a distance calculator, enclosed by the first casing and the cover, which obtains a distance to the target based on the detection signal, and
      a first input-output port disposed on the first casing;

a display unit, separated from the measurement unit, that includes
a second casing integrally attachable on a wall of the first casing detachably,
a screen, disposed on the second casing, which displays an operating state of the measurement unit,
a second input-output port, disposed on the second casing, detachably connected to the first input-output port, and configured to supply electric power, via the first input-output port and a cable, between the measurement unit and the display unit and to communicate, via the first input-output port and the cable, between the measurement unit and the display unit, and
an external communication port, disposed on the second casing, which is different from the first input-output port and the second input-output port, configured to detachably connect a communication cable and communicate, via the communication cable, an area setting information specifying the monitoring area from an external computer which is different from the measurement unit and the display unit, to set the monitoring area; and
an intrusion detecting section, disposed on the measurement unit or the display unit, which determines whether an intruding object is present in the monitoring area based on the distance to the target obtained by the distance calculator, the scanning angle of the detection light detected by the angle sensor and the area setting information specifying the monitoring area communicated from the external computer, to generate the stop signal in response to determining that the intruding object is present in the monitoring area.

2. The area monitoring sensor according to claim 1, wherein
the measurement unit further includes the intrusion detecting section, the measurement unit communicates information representing an operating state of the measurement unit with the display unit via the first input-output port and the second input-output port.

3. The area monitoring sensor according to claim 2, wherein
the measurement unit further includes
a third input-output port configured to communicate with another measurement unit via a communication cable, wherein the measurement unit and the another measurement unit connect the display unit through a common bus.

4. The area monitoring sensor according to claim 3, wherein
the display unit further includes
a non-volatile memory which stores an operation setting information specifying an operating condition for the measurement unit and the area setting information communicated from the external computer, and
a setting data transmitter which transmits the operation setting information and the area setting information from the non-volatile memory to the measurement unit through the input-output port every time a main power is turned on.

5. The area monitoring sensor according to claim 4, wherein
the measurement unit further includes
a control signal generator which generates a timing control signal for adjusting timing generating the detection light among the light source of the measurement unit and a light source of the another measurement unit, and
control signal transmitter which transmits the timing control signal to the another measurement unit that is connected through the input-output port.

6. The area monitoring sensor according to claim 1, wherein
the measurement unit further includes a power circuit that is connected with an external power supply to supply electric power to the display unit by use of electric power supplied from the external power supply.

7. The area monitoring sensor according to claim 1, wherein
the display unit further includes a non-volatile memory which stores an operation setting information specifying an operating condition for the measurement unit and the area setting information communicated from the external computer, and
a setting data transmitter which transmits the operation setting information and the area setting information from the non-volatile memory to the measurement unit through the power cable every time a main power is turned on, and the non-volatile memory is detachably disposed on the display unit.

8. The area monitoring sensor according to claim 1, wherein the second casing of the display unit has a first surface, and the screen and the external communication port are disposed on the first surface of the second casing.

* * * * *